United States Patent [19]

Peng

[11] Patent Number: 5,408,352
[45] Date of Patent: Apr. 18, 1995

[54] OPTICAL SCANNER
[75] Inventor: Ke-Ou Peng, Delft, Netherlands
[73] Assignee: Opticon Sensors Europe BV, Hoofddorp, Netherlands
[21] Appl. No.: 2,654
[22] Filed: Jan. 11, 1993
[30] Foreign Application Priority Data
Jan. 14, 1992 [EP] European Pat. Off. ........... 92200094
[51] Int. Cl.$^6$ .............................................. G02B 26/08
[52] U.S. Cl. .................................... 359/203; 359/200; 359/201; 359/211; 359/216; 235/467; 250/236
[58] Field of Search .............................. 359/201–203, 359/211, 216–219, 198–200, 220; 235/462, 467, 470, 472; 250/234–236

[56] References Cited
U.S. PATENT DOCUMENTS

| 4,652,732 | 3/1987 | Nickl | 235/462 |
| 4,699,447 | 10/1987 | Howard | 359/203 |
| 4,795,224 | 1/1989 | Goto | 359/203 |
| 4,870,274 | 9/1989 | Hebert et al. | 250/236 |
| 4,971,410 | 11/1990 | Wike, Jr. et al. | 235/472 |
| 5,177,347 | 1/1993 | Wike, Jr. | 235/467 |
| 5,179,271 | 1/1993 | Lindacher et al. | 359/216 |

Primary Examiner—Loha Ben
Assistant Examiner—James Phan
Attorney, Agent, or Firm—Parmelee, Bollinger & Bramblett

[57] ABSTRACT

Optical scanner, comprising a laser source for generating a laser beam, a first deflector for deflecting the laser beam towards a array of reflectors, the first deflector and the array of reflectors being rotatable relative to each other about a first axis, drive means for providing a rotation, and at least one detector for detecting back-scattered light, further comprising a second deflector being rotatable about a second axis for deflecting the beam reflected by the array of reflectors in a direction substantially parallel or coincident with the second axis.

8 Claims, 3 Drawing Sheets

OPTICAL SCANNER

BACKGROUND OF THE INVENTION

The invention relates to an optical scanner, more particularly an optical scanner suitable for scanning bar codes, comprising a laser source for generating a laser beam, a first deflector for deflecting the laser beam towards an array of reflectors, the first deflector and the array of reflectors being rotatable relative to each other about a first axis, drive means for providing a rotation, and at least one detector for detecting backscattered light. Such an optical scanner is known from U.S. Pat. No. 4,699,447.

In the known optical scanner the array of reflectors is constituted by a basket-shaped array of mirrors. A centrally positioned rotatable mirror deflects the beam generated by a laser source towards the mirrors of the basket-shaped array, the laser beam sweeping across the mirrors so as to generate scanning lines. From each mirror of the array the laser beam is subsequently directed towards the bar code to be scanned. As the scanner during operation is usually pointing at the bar code to be scanned, this bar code will be located on or near the axis of the scanner, this axis in the known scanner being the rotational axis of the centrally positioned rotatable mirror. Since the mirrors of the array are necessarily located off-axis, the laser beam reflected by the mirrors of the array will be slanted relative to the axis of the scanner so as to be directed towards the axis and thus towards the bar code located on this axis. Due to this slant of the reflected beam, however, there will be only a limited region in which the reflected beam is located near the axis and thus on the bar code. This region, which constitutes the effective scanning region, will be located at the intersection of the reflected beam and the axis. At a point nearer to or further away from the scanner and thus removed from this intersection, the reflected beam will not be able to scan the bar code since it will not cross all the bars of the code. The effective scanning range of this known scanner is therefore limited to the region where the reflected laser beam intersects the axis, since the laser beam will not be able to (completely) scan a bar code outside this region. Placing the bar code off-axis is not a solution, since in that case the light reflected by one or two mirrors may impinge upon the code, but the light reflected by the mirrors opposite those one or two mirrors will miss the bar code altogether, resulting in an incomplete scanning pattern and a decreased chance of reading the code correctly. This problem is aggravated by the fact that in the typical scanning pattern the most effective region for reading a bar code is around the center of the pattern. Preferably, the scanner should be able to provide a scanning pattern of which at least the central region is independent or virtually independent of the scanning distance, i.e. independent of the distance of the bar code from the scanner.

SUMMARY OF THE INVENTION

It is therefore an object of the invention to provide an optical scanner having an enlarged scanning range, thus making a successful scanning of bar codes possible, virtually irrespective of their distance from the scanner. It is a further object of the invention to provide an optical scanner capable of producing a scanning pattern which is virtually independent of the scanning distance.

According to the invention, an optical scanner having an improved scanning range is characterized in that the scanner further comprises a second deflector rotatable about a second axis for deflecting the beam reflected by the array of reflectors in a direction substantially parallel or coincident with the second axis.

As the second deflector according to the invention redirects the laser beam to the second axis, thus making the laser beam emanating from the scanner parallel or coincident with this axis, the laser beam of the scanner will impinge upon a bar code located on or near the axis, irrespective of the distance of the code from the scanner. Since the reflected beam is not slanted, the effective scanning region is not limited to an area near the intersection of the beam and the axis as in the scanner known from U.S. Pat. No. 4,699,447. In fact, in the scanner according to the invention the reflected beam will in most instances at least in one point of each scanning line be substantially coincident with the axis, thus ensuring an optimal scanning capability.

The scanning axis of the optical scanner on or near which the bar code to be scanned must be located is constituted by the second axis, as the second axis is the axis the laser beam emanating from the scanner is parallel or coincident with. According to a first embodiment of the invention, the first axis and the second axis coincide. That is, the first deflector and the array of deflectors rotate relative to each other about the same axis as the second deflector. This is however not necessary, as will be demonstrated in a second embodiment of the invention, in which the first axis and the second axis are parallel.

It will be understood that the above-mentioned first and second axes are geometrical rather than mechanical axes, and that in an actual embodiment of the scanner the two axes may, although geometrically coincident, be mechanically distinct. This may especially be the case when, according to a preferred embodiment, the drive means are arranged for providing a stepped rotation of the second deflector. With such a stepped rotation, the curvature of the scanning lines across the bar code can be virtually eliminated by halting the movement of the second deflector during the scanning of each reflector, and rapidly moving the second deflector to its next position, preferably opposite the next reflector of the array, just before the scanning of the next mirror. If the first and second axes geometrically coincide in such an arrangement, the mechanical axis is advantageously constituted by a double axis, one axis being hollow so as to accommodate the other axis, thus enabling for example a continuous rotation of the first deflector and a discontinuous rotation of the second deflector. The drive means should in that case of course be adapted for providing these two different rotational movements.

Preferably, the drive means comprises an electric motor having a hollow shaft. This allows the laser beam emanating from the laser source to pass through the shaft, thus being substantially coincident with the first and/or, if necessary, the second axis. This arrangement provides an advantageous angle of incidence of the laser beam upon the first deflector. In order to provide a more flexible positioning of the laser source relative to the deflectors and the drive means, the scanner according to the invention may further comprise a third deflector for directing the laser beam emanating from the laser source towards the first deflector. Such a third deflector can e.g. be used for directing the laser beam through the hollow shaft of the drive means.

The third deflector can be constituted by a mirror or a prism. Preferably, the first deflector and/or the second deflector is constituted by a mirror or a prism. In case a prism is used in a configuration in which the first and second deflector carry out the same rotation, the first and second deflectors can advantageously be combined into a single prism.

The array of reflectors produces a scanning pattern, the number of scanning lines of the pattern being dependent on the number of reflectors. As in most cases a star-shaped scanning pattern (asterisk) is desired, the scanning lines produced by the reflectors are rotated relative to each other. Since two coincident scanning lines are superfluous, an odd number of scanning lines provides an optimal scanning efficiency. Consequently, the optical scanner according to the invention is preferably arranged in such a way that the array of reflectors comprises an odd number of reflectors.

In a first embodiment of the optical scanner according to the invention, the array of reflectors is constituted by a substantially ring-shaped arrangement of mirrors, the first and second deflector being arranged coaxially relative to the ring. That is, the first and second deflectors are preferably located in or near the center of the ring. It will be understood that the substantially ring-shaped arrangement also comprises other approximately annular arrangements, such as polygonal arrangements of mirrors, the reflective sides of the mirrors substantially facing the center of the arrangement. The mirrors may be positioned orthogonally with respect of the plane defined by the ring, but may also be tilted with respect to this plane. The particular tilting angle of the mirrors will depend on the relative locations and tilting angles of the first and second deflectors. Preferably, the ring of mirrors is stationary while the first and second deflectors rotate. It is however possible to keep the first deflector stationary while rotating the array of mirrors. This may result in a scanning pattern consisting of a single line or, if the mirrors of the array have mutually different tilting angles, in a pattern consisting of parallel lines. It is also possible to rotate both the array of mirrors and the first deflector, if necessary in opposite directions. The second deflector, which is rotated to generate a star-shaped scanning pattern but could be stationary if a linear scanning pattern were desired, can rotate together with the first deflector, in which case both reflectors could be mounted in a common unit, or can rotate independently, e.g. for carrying out a stepped rotation.

Although this first embodiment of the scanner according to the invention provides a good scanning capability, the scanning lines generated with the aid of an array of (tilted) mirrors will only be straight if the first and second deflectors rotate independently. This necessitates the use of two motors or of a relatively complicated gear system, thus increasing the costs of the scanner. For some applications, however, substantially straight scanning lines are desired. In the optical scanner according to the invention the curvature of the scanning lines can be minimized, even if only one motor is used, by a proper choice of the geometry of the components, i.e. of the angles and relative positions of the first and second mirrors in conjunction with the angles of the mirrors in the array. Alternatively, additional optical components can be used to minimize the curvature.

Another way to minimize or eliminate the curvature of the scanning lines is realized in a second embodiment of the optical scanner according to the invention, in which the array of reflectors is constituted by reflective faces of a polygon. With such an arrangement, which can be realized with only one motor, the angle of incidence of the laser beam upon the reflectors of the array, i.e. the outer faces of the polygon, can be close or equal to 90°. Thus a substantially normal incidence of the laser beam can be realized, resulting in straighter scanning lines. A scanning pattern comprising substantially parallel scanning lines can be obtained if the reflective faces of the polygon have mutually different tilting angles.

Preferably, the polygon is arranged on an arm, the arm being rotatable about the second axis and the polygon being rotatable relative to the arm about the first axis, the first deflector and the second deflector being non-rotatably fixed on the arm. With such an arrangement, the curvature of the scanning lines is reduced when the speed of rotation of the polygon is increased and the speed of rotation of the arm is decreased.

The polygon can be rotated relative to the arm by a separate motor. A simpler and more cost-effective structure is obtained when the polygon is rotated by a wheel connected to the polygon, the wheel being in contact with a race. As an alternative, the polygon is rotated by a belt driven by the drive means.

The first deflector and the second deflector can be constituted by mirrors or a prism. If a further deflector, consisting of two mirrors or a prism, is used to direct the laser beam emanating from the first deflector towards the polygon, the first and second deflector can advantageously be constituted by the same element. That is, the first deflector and the second deflector are constituted by a two-sided mirror.

The tilting angles of the facets of the polygon may be different from each other, resulting in a scanning pattern having parallel scanning lines.

In general, a multi-directional scanning pattern is preferably produced, comprising a plurality of scanning lines around the axis of rotation of the second deflector. Such a pattern, which is typically symmetrical or nearly symmetrical, allows the effective scanning of e.g. bar codes in a plurality of directions.

BRIEF DESCRIPTION OF THE DRAWINGS

The invention will further be explained under reference to the accompanying drawings.

DETAILED DESCRIPTION OF THE EMBODIMENT

Figure 1:
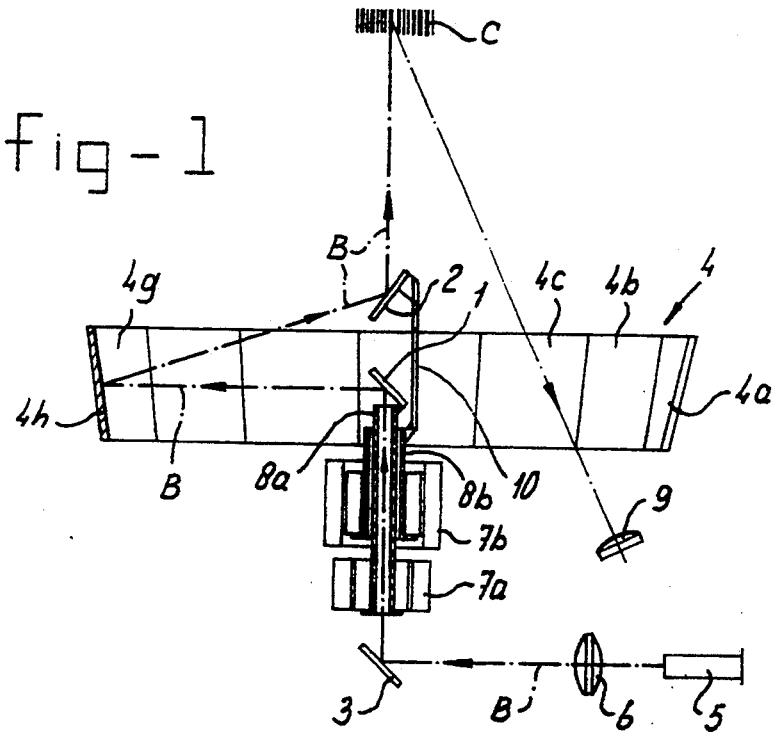
FIG. 1 shows a first embodiment of the optical scanner according to the invention in partial cross-section.

In FIG. 1a an optical scanner according to the invention is depicted in partial cross-section. The scanner comprises a first deflector 1, a second deflector 2, a third deflector 3, an array 4 of mirrors (4a–4o), a laser source 5, focussing optics 6, a drive means 7 having a shaft 8, as well as at least one detector 9.

The laser source 5, which may be a commercially available diode laser, generates a laser beam B which is focussed by the focussing optics 6, which can comprise a single lens or a set of lenses. The third deflector 3, which is in the illustrated embodiment constituted by a mirror, directs the laser beam through the hollow shaft 8 of the drive means 7. It will be understood that the third deflector 3 can be omitted when the laser source 5 is arranged in such a way that the laser beam B is aimed directly at the first deflector 1. The first deflector 1, which is illustrated as being a mirror, deflects the laser beam B towards one of the mirrors 4a–4o of the array. From the array 4 of mirrors the beam is deflected towards the second deflector 2, which directs the laser beam B towards the a bar code C. As can be seen from FIG. 1, the part of the laser beam B deflected by the second deflector 2 is in line with the part of the laser beam B passing through the hollow shaft 8, and coincides with the axis of rotation of the shaft 8.

In the embodiment illustrated in FIG. 1, the rotational axes of the deflectors (i.e. mirrors) 1 and 2 coincide. The rotation of the first deflector 1 is provided by first drive means 7a via a first hollow shaft 8a, while the rotation of the second deflector 2 is provided by second drive means 7b via a second hollow shaft 8b and a rod 10 mounted on the shaft 8b, the shafts 8a and 8b being coaxial. The drive means 7a and 7b are preferably constituted by electric motors, which may be commercially available. This arrangement comprising two separate drive means 7a and 7b and two separate shafts 8a and 8b allows an independent movement of the deflectors 1 and 2. The drive means 7a could for example be arranged for providing a continuous rotation of the first mirror 1, while the drive means 7b could be constituted by a stepping motor for providing a stepwise rotation of the second deflector 2. In case the deflectors 1 and 2 are to perform identical rotations, the drive means 7a and 7b can be replaced by a single drive means 7, and the shafts 8a and 8b can be combined into a single shaft 8.

The shaft 8 (or shafts 8a and 8b) are preferably hollow in order for the scanner to produce a star-shaped scanning pattern. For a drive means 7 having a solid shaft, the second deflector 2 has to be shifted off-axis to allow the laser beam to be incident on the first deflector 1. Most scanning patterns produced with such an arrangement will not intersect the rotational axis. Such a pattern may, however, still be acceptable if the shift is relatively small.

Figure 2:
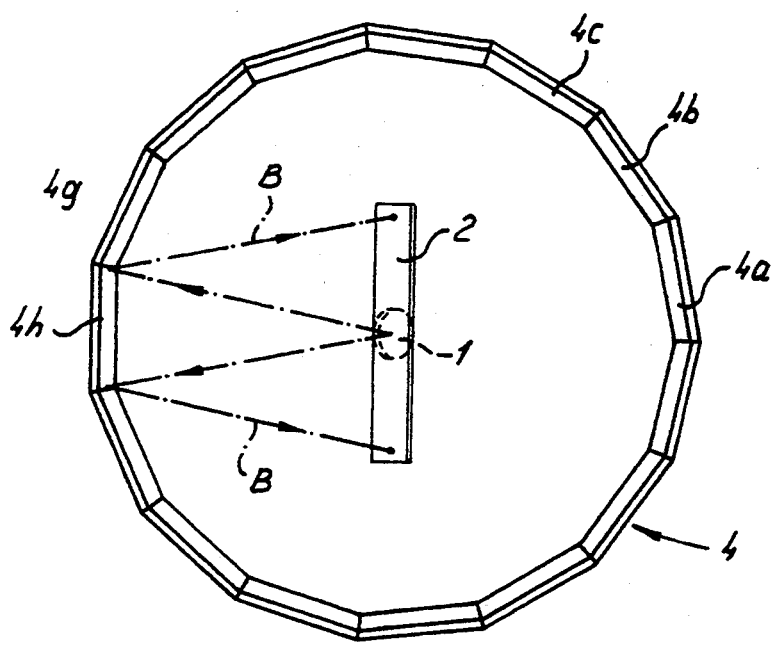
FIG. 2 shows the optical scanner of FIG. 1 in top view.

As is shown in FIG. 2, the array of mirrors is approximately ring-shaped. The embodiment shown comprises an odd number, i.e. 15, mirrors 4a–4o, thus constituting a polygon having internal reflective sides.

As can be seen from FIGS. 1 and 2, the mirrors of the array 4 are tilted relative to the rotational axis, i.e. relative to the shafts 8a and 8b. Also, the first deflector 1 is arranged so as deflect the laser beam B over an angle of approximately 90°. If the relative positions and the tilting angles of at least one of the deflectors 1 and 2 are changed, the tilting angles of the mirrors of the array 4 may also be changed, e.g. so as to be parallel with the rotational axis. Proper combinations of positions and tilting angles resulting in a minimized curvature of the scanning lines produced by the inventive scanner may also be achieved. Additional optics may be used to minimize this curvature and to produce a scanning pattern which is substantially identical in all scanning planes along the axis irrespective of their distance from the scanner. The scanning and reading of e.g. a bar code can therefore effectively be realized at various distances and in various orientations.

The deflectors 1 and 2 are centrally located with respect to the approximately ring-shaped array 4. The second deflector 2 has a width which is sufficient to deflect the entire scanning line produced by a mirror, e.g. mirror 4h. That is, the laser beam B reflected by the peripherical areas of the mirror 4h should also be deflected by the deflector 2, as is schematically illustrated in FIG. 2. It will be understood that the beam deflected by any part of the deflector 2 will be substantially parallel or coincident with the axis of rotation, as shown in FIG. 1. The first deflector 1 may have much smaller dimensions, as it typically deflects a laser beam issuing from a single point.

The light backscattered by e.g. a bar code C is detected by the detector 9, provided with suitable optics, which may be connected with suitable decoding means (not shown).

Instead of an array of mirrors, another scanning pattern generator can be used, such as a disc comprising holographic elements. Such a disc could be positioned in a plane perpendicular to the first axis. Alternatively, holographic deflectors could be used instead of the mirrors shown in FIGS. 1 and 2.

Figure 3:
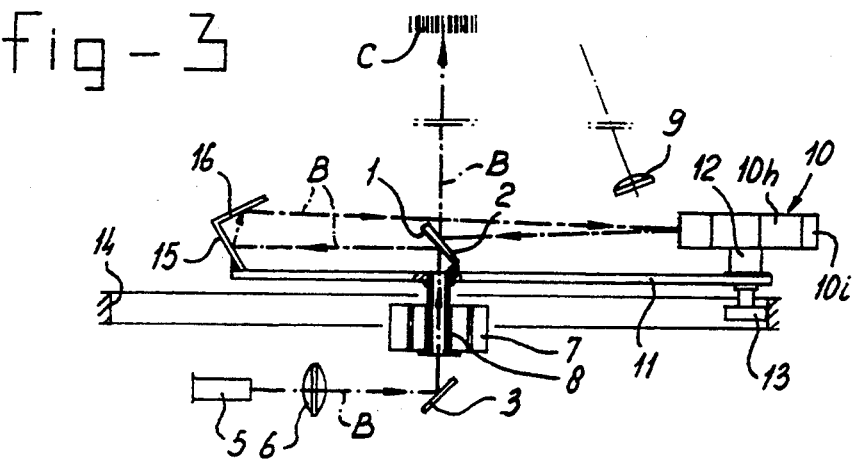
FIG. 3 shows a second embodiment of the optical scanner according to the invention in partial cross-section.

The embodiment shown in FIG. 3 also comprises a first deflector 1 and second deflector 2, these deflectors being combined into one double-sided mirror. The scanner further comprises a third deflector 3 and a polygon 10, the reflective sides 10a–10i of which are equivalent in function to the mirrors 4a–4o of the mirror array 4 of FIG. 1. It will be understood that the third deflector 3 can be omitted when the laser source 5 is arranged in such a way that the laser beam B is aimed directly at the first deflector 1. The embodiment of FIG. 3 also comprises a laser source 5, focussing optics 6, a drive means 7 with a hollow shaft 8, as well as an detector 9 with suitable optics. The polygon 10 is mounted on an arm 11, which is rotatable around an axis constituted by the shaft 8. In order to rotate the polygon 10 relative to the arm 11, the polygon 70 is via a rotatable axis 12 connected with a wheel 13, which during operation is in rolling contact with a race 14. As the arm 11 is rotated by the drive means 7, the wheel 13 rolls along the race 14 thus rotating the axis 12 and the polygon 10 relative to the arm 11. It is, however, also possible to rotate the polygon 10 by other means, e.g. by a second drive means or by gears and a drive shaft (not shown). It will be understood that in the embodiment of FIG. 3 the axis 12 constitutes the first axis, while the shaft 8 constitutes the second axis.

In the embodiment shown in FIG. 3, the lower side 1 of the two-sided mirror deflects the laser beam B emanating from the hollow shaft 8 in such a way, that the deflected beam B is substantially perpendicular to the axis of rotation provided by the shaft 8. The beam is further deflected by mirrors 15 and 16, mounted on the arm 11, in the direction of the rotating polygon 10. The angle of incidence of the laser beam B upon the reflective faces 10a–10i is preferably approximately 90°. The beam reflected by the polygon 10 sweeps across the upper side 2 of the two-sided mirror, producing a scanning line. The beam B and thus the scanning line is projected by the rotating deflector 2 onto e.g. a bar code C. As the deflector 2 is located on the rotational axis of the scanner, the scanning lines, which are rotated relative to each other, will also be substantially located on the axis. Light backscattered from the code C will be detected by the detector 9, which is provided with suitable optics, such as a lens, for focussing the backscattered light.

Figure 4:
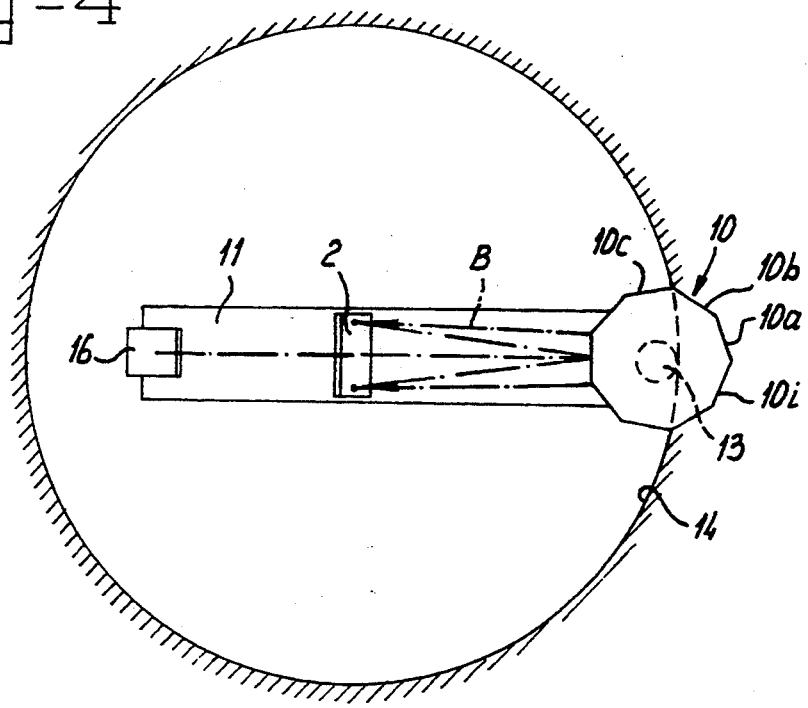
FIG. 4 shows the optical scanner of FIG. 3 in top view.

The top view of FIG. 4 clearly shows the structure of this embodiment of the inventive scanner, comprising the race 14 and the arm 11 on which the mirrors 15 and 16 and the polygon 10 are mounted.

Figure 5:
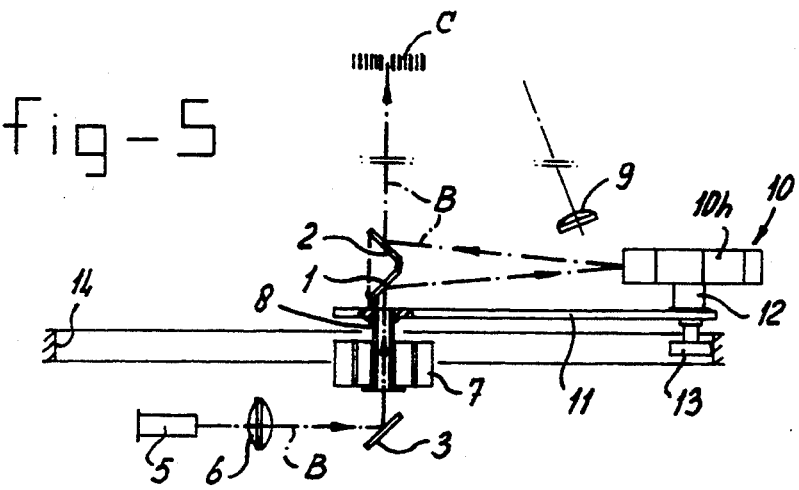
FIG. 5 shows a modified version of the scanner of FIG. 3 in partial cross-section.

The embodiment of FIG. 5 differs from that of FIG. 3 in that the deflectors 1 and 2 are not constituted by a two-sided mirror or mounted back-to-back, but are mounted adjacent to each other, the first deflector 1 being fixed on the arm 11. The deflectors 1 and 2 may be substituted by the reflective faces of a single structure, e.g. a prism.

The relative dimensions of the components of the scanner shown in FIG. 5 are preferably chosen so as to make the laser beam B approximately perpendicular to the faces 10a–10i on which it is incident.

The faces 10a–10i are shown to be parallel with their axis of rotation, i.e. the axis 12. For some applications it may, however, be advantageous to employ a polygon 10 having tilted faces 10a–10i.

Figure 6:
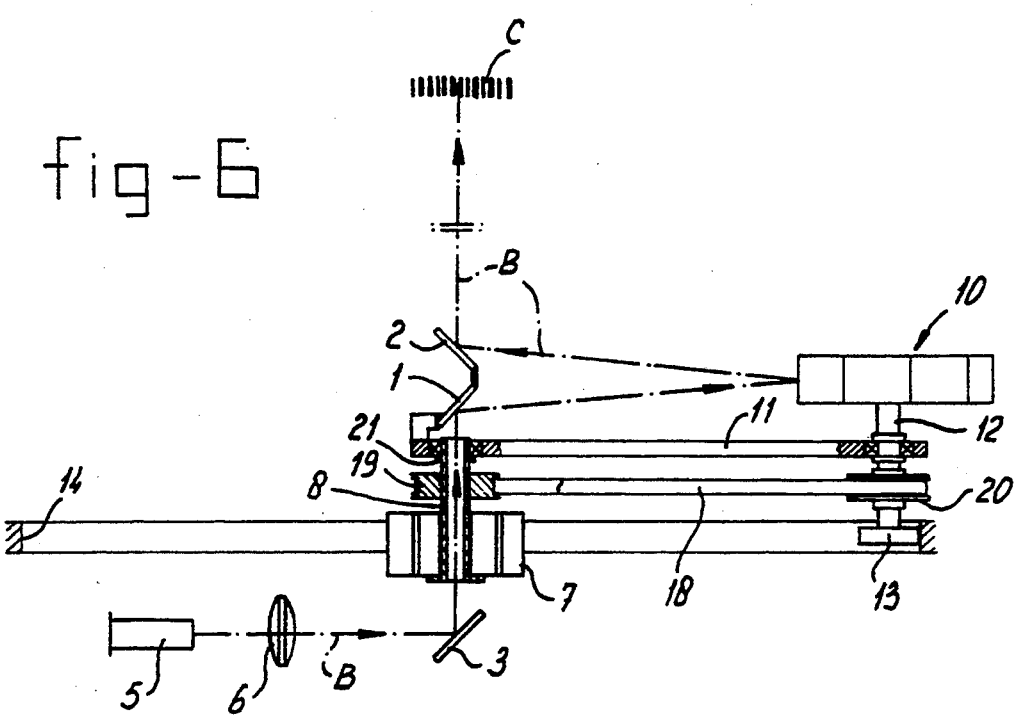
FIG. 6 shows an alternative version of the second embodiment of the scanner according to the invention in partial cross-section.

In the embodiment shown in FIG. 6, the arm 11 is not directly rotated by the drive means 7 but indirectly via a belt 18 and the wheel 13. The drive means 7 rotates a wheel 19, which is fixedly mounted on the hollow shaft 8. The rotational movement of the wheel 19 is transferred by means of the belt 18 to a wheel 20 which is fixedly connected with the axis 12. The rotation of the wheel 20, and thus of the axis 12, the polygon 10 and the wheel 13, causes the wheel 13 to roll along the race 14. This in turn causes the arm 11 to rotate around the shaft 8, on which it is rotatably mounted by means of a bearing 21. Apart from the drive mechanism, the embodiment of FIG. 6 is substantially identical to that of FIG. 5.

Figure 7A:
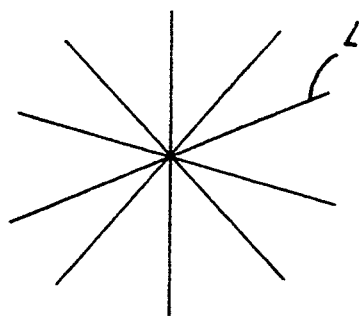
FIG. 7a and 7b show scanning patterns produced by means of an optical scanner according to the invention.

The scanning pattern shown in FIG. 7a is typical of the first embodiment of the inventive scanner as illustrated in FIGS. 1 and 2. The star-shaped pattern shown consists of a number of scanning lines L converging on and intersecting in a common point. The actual number of scanning lines L depends on the number by mirrors of the array 4. Preferably, the number of mirrors is odd.

Figure 7B:
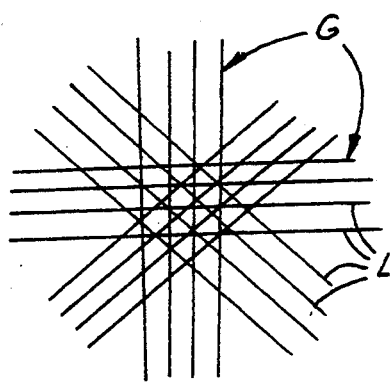

The scanning pattern shown in FIG. 7b may be produced by the second embodiment shown in FIGS. 3, 4, 5 and 6. The scanning lines L converge on a common area but do not all intersect in the same point. The pattern of FIG. 7b consists of a number of groups G of scanning lines L. Each group G is made up of a number, e.g. four, parallel scanning lines L. The total number of lines L is determined by the total number of faces 10a–10i of the polygon 10 and of the rotational speed of the arm 11.

The scanning patterns illustrated in FIGS. 7a and 7b provide an excellent scanning capability and are, due to the specific structure of the inventive scanner, virtually independent of the distance of the scanning plane from the optical scanner.

It will be understood that various modifications can be made in the embodiments described herein without departing from the scope of the present invention.

I claim:

1. An optical scanner comprising:
   a laser source for generating a laser beam,
   at least one detector for detecting back-scattered light,
   a first deflector for deflecting said laser beam towards an array of reflectors,
   said first deflector and said array of reflectors being rotatable relative to each other about an axis of rotation,
   a first driving means for providing said relative rotation between said first deflector and said array of reflectors,
   a second deflector substantially rotatable about said axis of rotation,
   a second driving means for rotating said second deflector for deflecting said beam reflected by said array of reflectors in a direction substantially along said axis of rotation,
   said second driving means providing a stepped rotation of said second deflector.

2. An optical scanner according to claim 1, wherein said array of reflectors is constituted by a substantially ring-shaped arrangement of mirrors arranged substantially coaxially relative to said axis of rotation.

3. An optical scanner according to claim 2, wherein said first deflector, said second deflector and said mirrors of said array have tilting angles chosen so as to produce scanning lines having a minimal curvature.

4. An optical scanner according to claim 1, wherein said array of reflectors comprises an odd number of reflectors.

5. An optical scanner according to claim 1, wherein said first driving means comprises a first electric motor having a first hollow shaft and said second driving means comprises a second electric motor having a second hollow shaft coaxially arranged relative to said first hollow shaft.

6. An optical scanner according to claim 1, further comprising a third deflector for directing said laser beam emanating from said laser source towards said first deflector.

7. An optical scanner according to claim 1, wherein said first deflector comprises a first mirror and said second deflector comprises a second mirror.

8. An optical scanner according to claim 1, wherein said first and second deflectors are prisms.

* * * * *